(12) United States Patent
Schröder

(10) Patent No.: US 6,215,415 B1
(45) Date of Patent: Apr. 10, 2001

(54) PARKING AID FOR A MOTOR VEHICLE HAVING SENSORS WITH SUBSTANTIALLY THE SAME DETECTION AREA

(75) Inventor: Hans-Joachim Schröder, Wiesbaden (DE)

(73) Assignee: Mannesmann VDO AG, Frankfurt (DE)

(*) Notice: Subject to any disclaimer, the term of this patent is extended or adjusted under 35 U.S.C. 154(b) by 0 days.

(21) Appl. No.: 09/388,760

(22) Filed: Sep. 2, 1999

(30) Foreign Application Priority Data

Sep. 2, 1998 (DE) .............................. 198 39 942

(51) Int. Cl.[7] ...................................... G08G 1/14
(52) U.S. Cl. ............... 340/932.2; 340/435; 340/436; 340/539; 250/349
(58) Field of Search ................... 340/932.2, 435, 340/436, 903, 437, 508, 522, 904; 250/349

(56) References Cited

U.S. PATENT DOCUMENTS

| | | | |
|---|---|---|---|
| 4,467,313 | * | 8/1984 | Yohsino et al. ............ 340/904 |
| 4,490,716 | * | 12/1984 | Tsuda et al. .............. 340/904 |
| 4,528,563 | * | 7/1985 | Takeuchi ................. 340/903 |
| 5,396,070 | * | 3/1995 | Lee ...................... 250/349 |
| 5,574,426 | * | 11/1996 | Shisgal et al. ........... 340/435 |
| 5,754,123 | * | 5/1998 | Nashif et al. ............ 340/903 |
| 5,940,011 | * | 8/1999 | Agravante et al. ......... 340/903 |
| 5,999,092 | * | 8/1998 | Smith et al. ............. 340/436 |

FOREIGN PATENT DOCUMENTS

| | | |
|---|---|---|
| 3244358 | 6/1984 | (DE) . |
| 3420004 | 12/1985 | (DE) . |
| 4023538 | 1/1992 | (DE) . |
| 197 11 467 | 10/1997 | (DE) . |

* cited by examiner

*Primary Examiner*—Jeffery A. Hofsass
*Assistant Examiner*—Phung Nguyen
(74) *Attorney, Agent, or Firm*—Mayer, Brown & Platt

(57) ABSTRACT

A parking aid for a motor vehicle, which measures the distance between an object and the motor vehicle in a contactless manner and has a plurality of sensors which are arranged on the motor vehicle, each sensor emitting a signal and receiving the signal reflected from an object located in the direction of the beam, and an evaluation device connected to the sensors determining the distance between the object and the motor vehicle from the signals received. The outlay for electrically synchronizing the sensors is reduced and which nevertheless allows reliable detection of the actual object for accurate measurement of the distance, has three sensors which are arranged directly next to one another to provide approximate coverage of the same detection area, whereby the main beam of each sensor having approximately the same beam angle.

18 Claims, 2 Drawing Sheets

PARKING AID FOR A MOTOR VEHICLE HAVING SENSORS WITH SUBSTANTIALLY THE SAME DETECTION AREA

FIELD OF THE INVENTION

The invention relates to a parking aid for a motor vehicle, which measures the distance between an object and the motor vehicle in a contactless manner and has a plurality of sensors which are arranged on the motor vehicle, each sensor emitting a signal and receiving the signal reflected from an object located in the direction of the beam, an evaluation device connected to the sensors determining the distance between the object and the motor vehicle from the signals received.

BACKGROUND OF THE INVENTION

To make the motor vehicle easier to drive and avoid collisions with cars or other objects in the way, it is known to provide sensors at the front and/or rear of the motor vehicle, these sensors transmitting ultrasonic or radar signals, for example, and receiving the signals reflected from the obstacle. In this arrangement, the distance between the sensor arranged on the motor vehicle and the obstacle is determined from the propagation time of the signal from the sensor to the obstacle and back again.

A collision warning system of the same generic type is known from the as yet unpublished patent application DE 197 11 467.9, in which contactless distance measurement between an obstacle and a motor vehicle is carried out with a plurality of sensors. In this arrangement, one sensor transmits a sensor signal in all cases, and this signal is reflected by an object situated in the sensor beam. The reflected signal is received by all the sensors. To enable imaginary objects reliably to be excluded, all possible positions of the object relative to the motor vehicle are determined from the propagation times of three sensors. Only those positions of the object are recognized as real which are detected by all three sensors.

Particularly for propagation-time measurement, referred to as indirect, in which the signal is transmitted by one sensor and the reflected signal is received by another sensor, it is necessary that the sensors should be synchronized with the aid of an evaluation device, ensuring that each sensor is ready to receive when the signal reflected by the obstacle reaches it. Here, the evaluation device controls the time sequence in such a way that one sensor transmits a signal and all the sensors are then simultaneously switched to the receptive condition.

Particularly when using radar sensors, the electrical synchronization of the sensors is very complex, if not impossible, due to the rapid signal propagation times of the transmitted and reflected sensor signal, since the propagation times of the control signals on the connecting lines between the evaluation device and the sensor are always slower than the sensor signals, which propagate approximately at the speed of light.

Thus, there is a need to specify an arrangement for contactless measurement of the distance between an object and a motor vehicle, in which the outlay for electrically synchronizing the sensors is reduced and which nevertheless allows reliable detection of the actual object for accurate measurement of the distance.

Other needs will become apparent upon a further reading of the following detailed description taken in conjunction with the drawings.

SUMMARY OF THE INVENTION

In one form of the invention, the aforementioned needs are fulfilled by three sensors arranged directly next to one another to provide approximate coverage of the same detection area, the main beam of each sensor having approximately the same beam angle.

The invention has the advantage that the arrangement of the sensors at approximately the same location makes it possible to dispense completely with indirect propagation time measurements. This eliminates complex electronic synchronization in relation to the propagation times. The actual object is determined solely by direct measurements of the propagation time from the sensor to the object and back to the same sensor.

To increase reliability in the detection of stationary objects when using radar sensors, the evaluation device activates all sensors simultaneously to transmit the sensor signal and to receive the reflected signal, it being possible for each sensor to be activated with a different frequency for the transmission of the sensor signal. It is not necessary to select the sensor with regard to the measurement task. The signal received is differentiated in terms of the carrier frequency.

In a development in which it is possible to reduce the outlay for distinguishing between the signals received, the evaluation unit activates all the sensors in succession to transmit the sensor signal. Here, each sensor is activated with the same frequency.

A variant of simple construction is achieved if the sensors are arranged at a distance from the outer contour of the motor vehicle, with the result that the detection range of each sensor covers the entire outer contour extending in the direction of the beam of the sensor and the adjoining space. Setting the sensors back behind the bumper avoids gaps in measurement in the area close to the sensor since the measuring range of the sensors is fully effective, even in the area close to the bumper. The arrangement proposed makes it possible to achieve a greater degree of redundancy in the detection ranges of the individual transducers in the particularly critical close-up zone, thereby allowing better quality in the calculation of the distance of the object.

In one configuration, the evaluation device determines the propagation time between the transmission of the sensor signal of a sensor and the reception of the reflected sensor signal by the same sensor and from the propagation times of the three sensors determined in this way, determines the position and distance of the motor vehicle from the object.

A compact device is achieved if the evaluation device forms a structural unit with one sensor. However, the evaluation unit can also be an electronic system that would be present in the motor vehicle in any case.

The device according to the invention is particularly suitable for radar sensors, where the problems with propagation-time synchronization are particularly severe.

DETAILED DESCRIPTION OF THE PREFERRED EMBODIMENT

Figure 1:
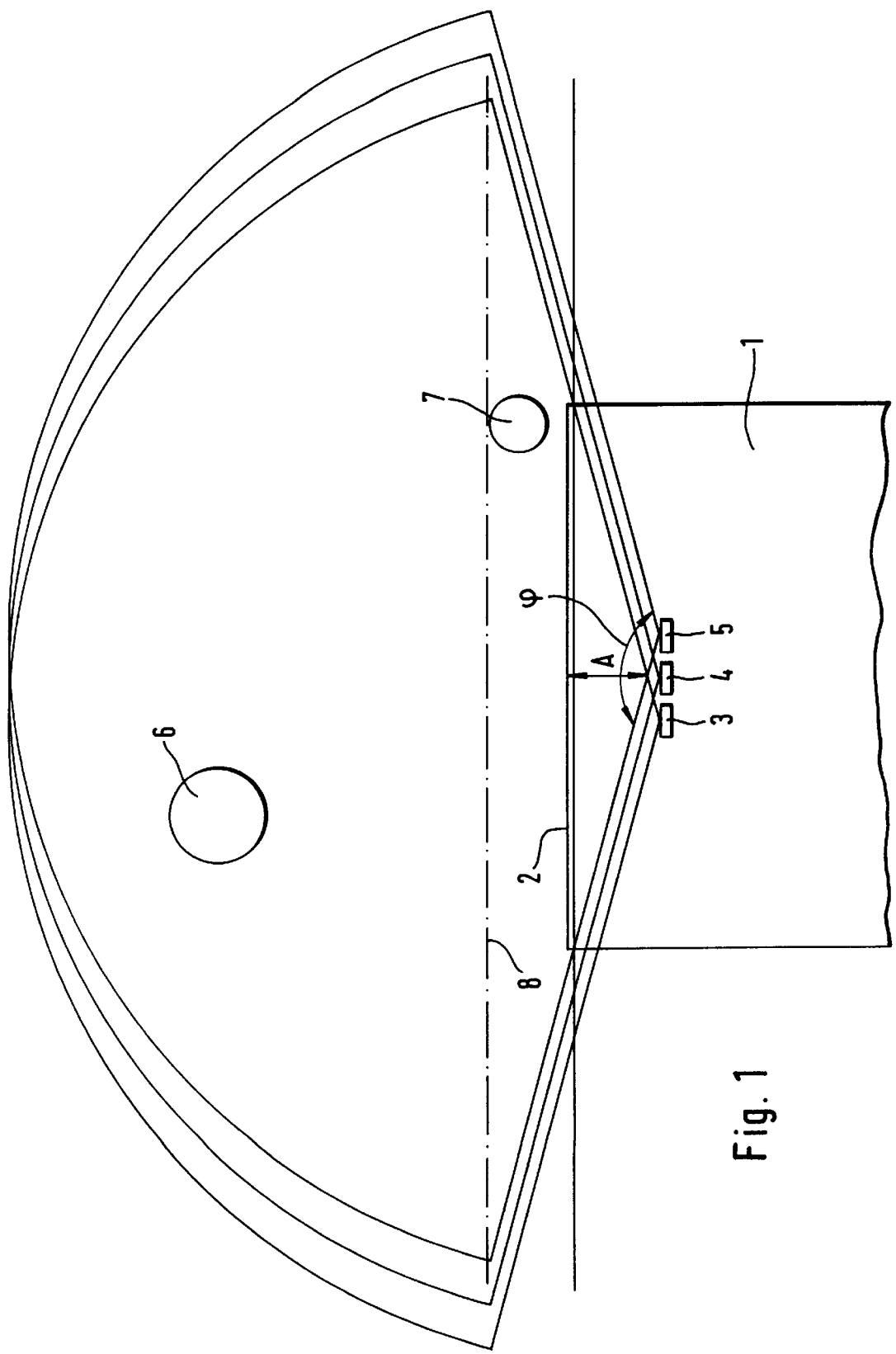
FIG. 1 shows an arrangement for determining the distance between an obstacle and a motor vehicle.

While the present invention is capable of embodiment in various forms, there is shown in the drawings and will be hereinafter described a presently preferred embodiment with the understanding that the present disclosure is to be considered as an exemplification of the invention, and is not intended to limit the invention to the specific embodiment illustrated and described herein.

FIG. 1 shows diagrammatically a reversing and parking aid as used in motor vehicles. Three radar sensors 3, 4, and 5 are arranged directly next to one another at the same height on the rear bumper 2 of a motor vehicle 1, the lateral spacing of the radar sensors 3, 4, and 5 being chosen in such a way that inaccuracies in the sensor signals are reliably prevented. The radar sensors 3, 4, and 5 are arranged under the vehicle body, on the floor of the vehicle, and are all at the same distance A from the bumper 2 of the motor vehicle 1. To prevent components of the vehicle from being detected as obstacles, beam guidance channels (not shown specifically), which run between the radar sensors 3, 4, and 5 and the bumper 2 and screen the beam path of the radar sensors 3, 4, and 5, are provided.

The beam angle φ of the three radar sensors 3, 4, and 5 is approximately equal and is about 140 to 170 degrees, thereby covering the entire area of the bumper, including its peripheral areas. This allows a stationary obstacle 6, 7 to be detected at a distance of over two meters from the motor vehicle.

Thanks to this arrangement, the rear area of the motor vehicle can be sensed completely and reliably for the presence of obstacles 6, 7. Here, there is an obstacle 7 in the area between the bumper 2 and the recognition horizon 8. The recognition horizon 8 is at about 50 cm from the bumper 2 and is not evaluated by conventional reversing and parking aids. Because the radar sensors 3, 4, and 5 are set back, even obstacles in this area are reliably detected.

Figure 2:
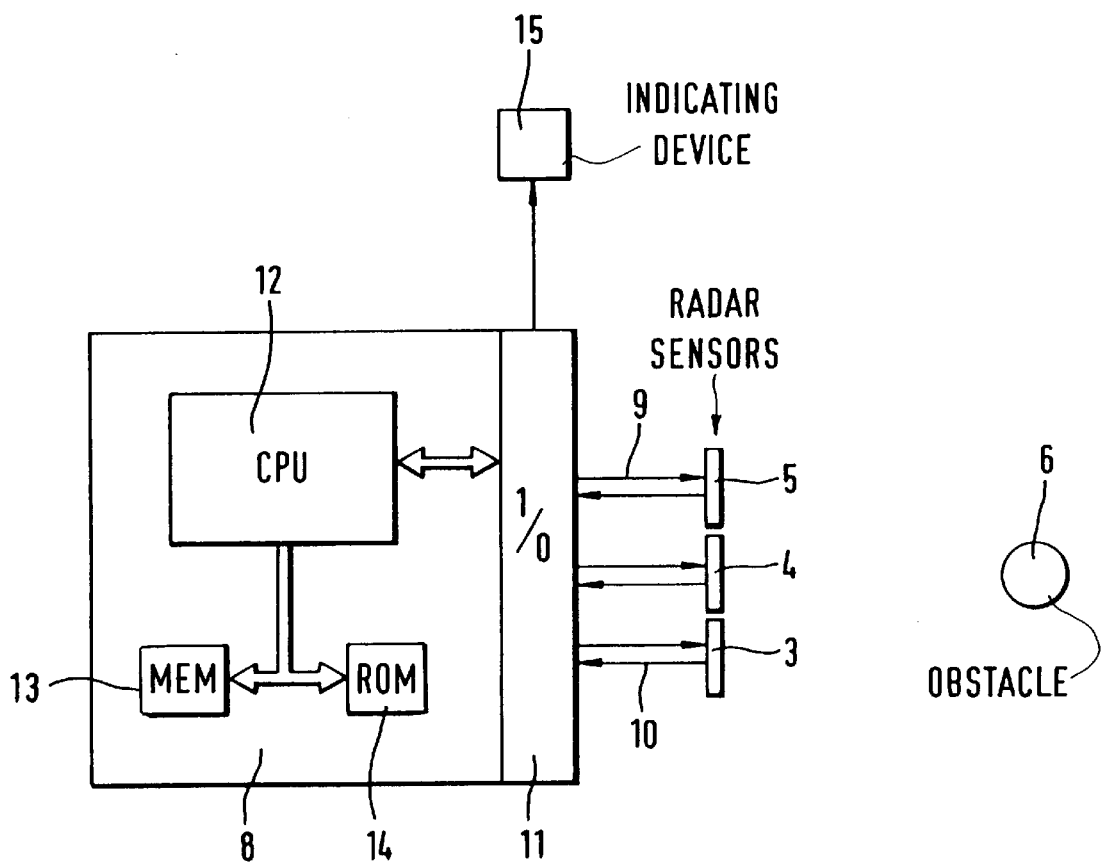
FIG. 2 shows an evaluation device.

The radar sensors 3, 4, and 5 used serve both as transmitters and receivers. As illustrated in FIG. 2, an evaluation unit 8, which is preferably a microprocessor, is connected to each of the radar sensors 3, 4, and 5 by transmission 9 and reception lines 10. The microprocessor has an input and output unit 11, a central processor 12, a main memory 13 and a read-only memory 14.

The evaluation unit 8 is connected to an indicating device 15, which is usually a loud speaker and/or an optical device which emits a warning signal when the motor vehicle approaches an obstacle.

The evaluation unit 8 generates control pulses simultaneously for all the radar sensors 3, 4, and 5. These signals are passed via the line 9 to the respective radar sensors 3, 4 and 5 and are there converted into corresponding radar signals in the micropulse range. Each radar sensor 3, 4, and 5 transmits a radar beam with a different frequency. The radar beam transmitted by each radar sensor 3, 4, and 5 is reflected by the object 6 (or object 7 in FIG. 1), each radar 3, 4, and 5 receiving its reflected radar signal (echoes). Once the signals have been transmitted, all three radar sensors 3, 4, and 5 are simultaneously switched to receive by the evaluation unit 8, and the echo received is converted into an electrical signal, which is passed to the evaluation unit 8 by each radar sensor 3, 4, and 5 via the line 10. With the aid of its internal clock generator (not shown specifically), the evaluation unit 8 measures the propagation time between the transmission and reception of the electrical pulse for each radar sensor 3, 4, and 5 and stores it in the main memory 13.

Generally, the propagation time t of the ultrasonic signal is used to determine the distance s between the motor vehicle (sensor) and the obstacle approximately in accordance with the known equation $$s = \tfrac{1}{2} \times c \times t$$

where c is the speed of light.

An evaluation method known per se, which is described, for example, in DE 40 23 538 A1, is used for accurate signal evaluation and determination of distances. The distance between a sensor and the obstacle as determined in accordance with the above formula allows all possible positions of the obstacle on the arc of a circle. The actual position of the obstacles 6 and 7 is obtained from the point of intersection of the three arcs, each arc being attributable to the measurement of a different sensor.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A parking aid for a motor vehicle, which measures the distance between an object and the motor vehicle in a contactless manner, comprising a plurality of sensors which are arranged on the motor vehicle, each sensor emitting a signal and receiving the signal reflected from an object located in the direction of the signal, an evaluation device connected to the sensors determining the distance between the object and the motor vehicle from the signals received, wherein three sensors are arranged directly next to one another to provide substantially the same coverage of a detection area, and wherein the main signal of each sensor has approximately the same signal angle.

2. The parking aid as claimed in claim 1, wherein the evaluation device activates the sensors simultaneously to transmit the sensor signal and then to receive the reflected signal, wherein each sensor activated with a different frequency for the transmission of the sensor signal.

3. The parking aid as claimed in claim 1, wherein the evaluation device activates the sensors in succession to transmit the sensor signal, all the sensors being activated with the same frequency.

4. The parking aid as claimed in claim 1, wherein the sensors are arranged at a distance from the outer contour of the motor vehicle, with the result that the detection range of each sensor covers the entire outer contour extending in the direction of the signal of the sensor and the adjoining space.

5. The parking aid as claimed in claim 2, wherein the sensors are arranged at a distance from the outer contour of the motor vehicle, with the result that the detection range of each sensor covers the entire outer contour extending in the direction of the signal of the sensor and the adjoining space.

6. The parking aid as claimed in claim 3, wherein the sensors are arranged at a distance from the outer contour of the motor vehicle, with the result that the detection range of each sensor covers the entire outer contour extending in the direction of the signal of the sensor and the adjoining space.

7. The parking aid as claimed in claim 1, wherein the evaluation device determines the propagation time between the transmission of the sensor signal of a sensor and the reception of the reflected sensor signal by the same sensor and from the propagation times of the three sensors determined in this way, determines the position and distance of the motor vehicle from the object.

8. The parking aid as claimed in claim 2, wherein the evaluation device determines the propagation time between the transmission of the sensor signal of a sensor and the reception of the reflected sensor signal by the same sensor and from the propagation times of the three sensors determined in this way, determines the position and distance of the motor vehicle from the object.

9. The parking aid as claimed in claim 3, wherein the evaluation device determines the propagation time between the transmission of the sensor signal of a sensor and the reception of the reflected sensor signal by the same sensors and from the propagation times of the three sensors determined in this way, determines the position and distance of the motor vehicle from the object.

10. The parking aid as claimed in claim 4, wherein the evaluation device determines the propagation time between the transmission of the sensor signal of a sensor and the reception of the reflected sensor signal by the same sensor and from the propagation times of the three sensors determined in this way, determines the position and distance of the motor vehicle from the object.

11. The parking aid as claimed in claim 7, wherein the evaluation device forms a structural unit with one sensor.

12. The parking aid as claimed in claim 7, wherein the evaluation device is an electronic system that would be present in the vehicle in any case.

13. The parking aid as claimed in claim 1, wherein the sensor is a radar sensor.

14. The parking aid as claimed in claim 2, wherein the sensor is a radar sensor.

15. The parking aid as claimed in claim 3, wherein the sensor is a radar sensor.

16. The parking aid as claimed in claim 4, wherein the sensor is a radar sensor.

17. The parking aid as claimed in claim 5, wherein the sensor is a radar sensor.

18. The parking aid as claimed in claim 6, wherein the sensor is a radar sensor.

* * * * *

UNITED STATES PATENT AND TRADEMARK OFFICE
CERTIFICATE OF CORRECTION

PATENT NO. : 6,215,415 B1
DATED : April 10, 2001
INVENTOR(S) : Hans-Joachim Schröder It is certified that error appears in the above-identified patent and that said Letters Patent is hereby corrected as shown below:

Claims,

Column 5,
Line 13, change "sensors" to -- sensor --.

Signed and Sealed this

Twenty-eighth Day of August, 2001

*Attest:*

*Attesting Officer*

NICHOLAS P. GODICI
*Acting Director of the United States Patent and Trademark Office*